V. V. TORBENSEN.
AXLE AND WHEEL CONSTRUCTION FOR POWER DRIVEN VEHICLES.
APPLICATION FILED JULY 18, 1919.

1,417,426.

Patented May 23, 1922.
5 SHEETS—SHEET 2.

INVENTOR
Viggo V. Torbensen
BY
*[signature]*
ATTORNEY

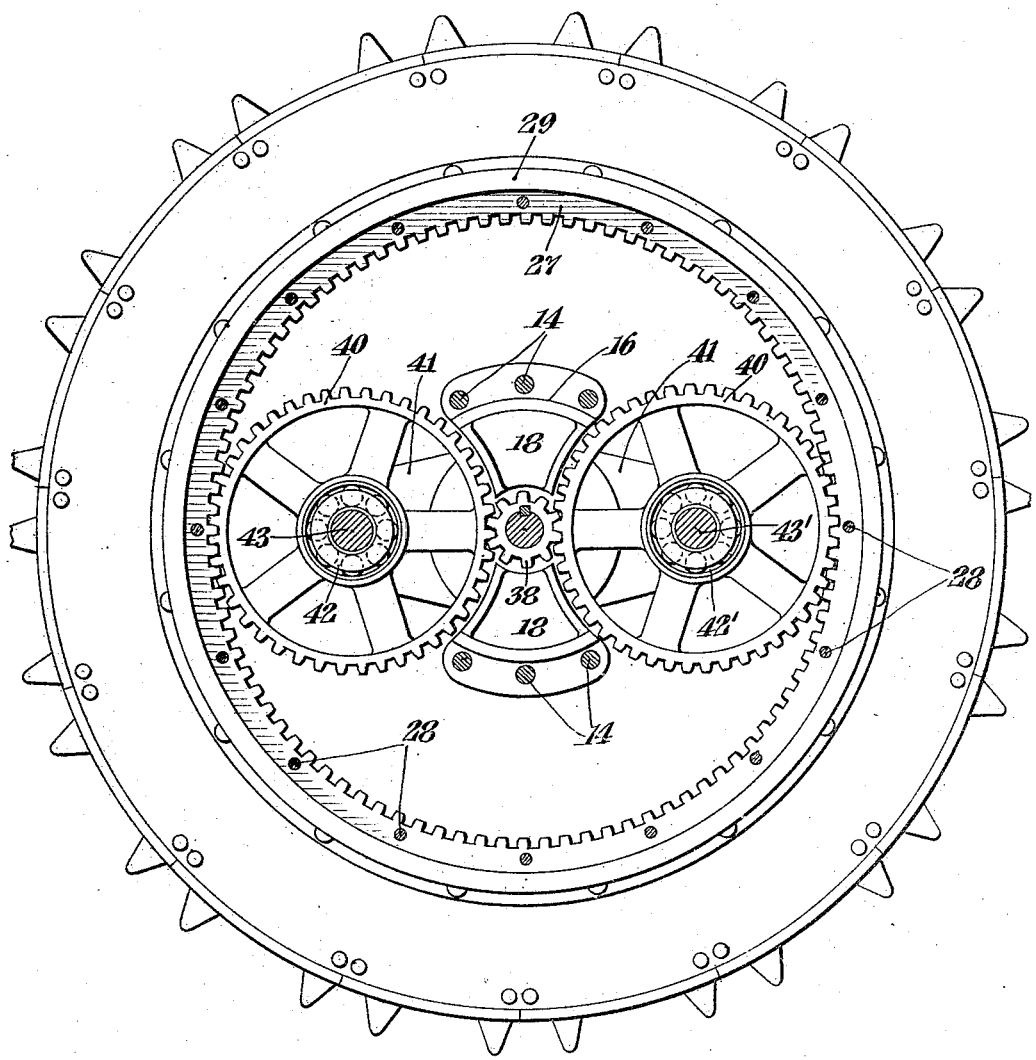

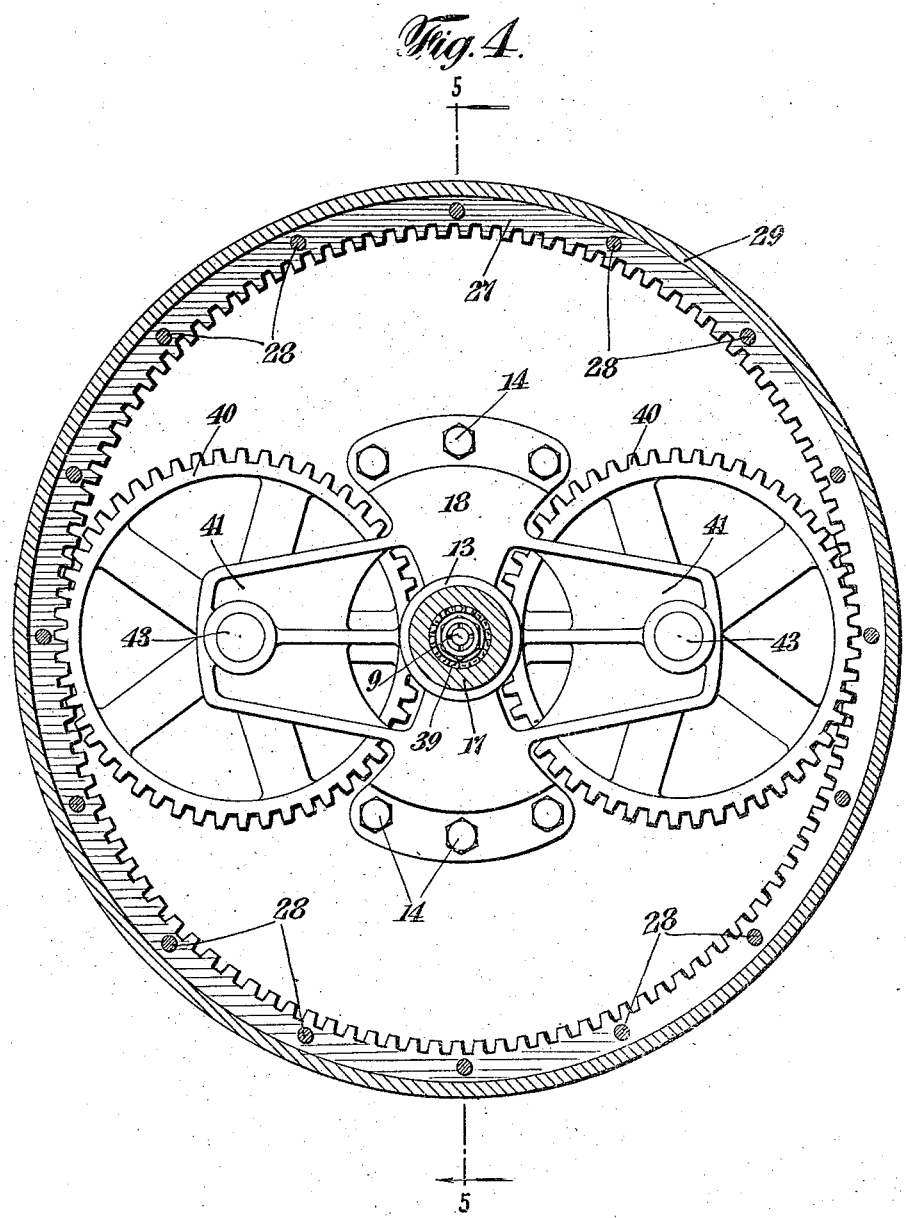

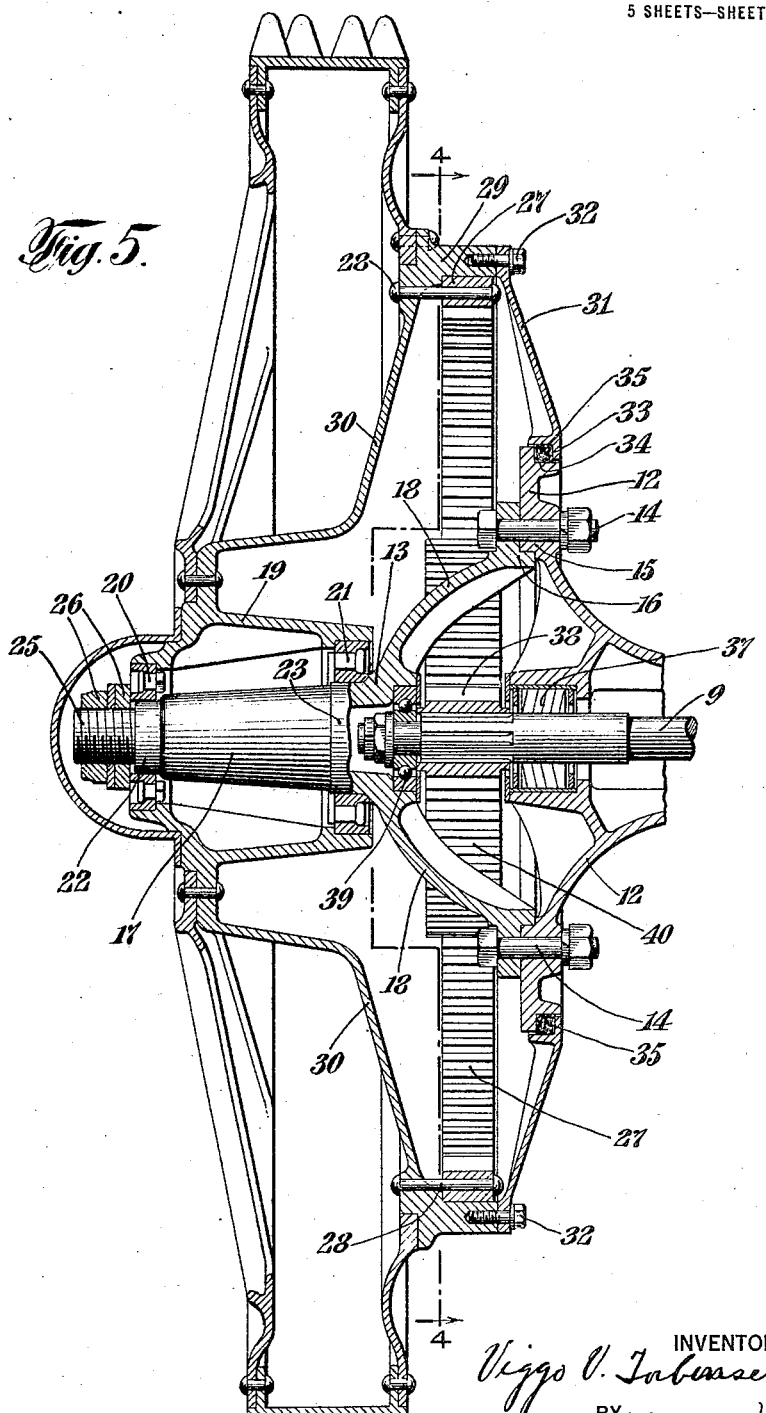

UNITED STATES PATENT OFFICE.

VIGGO V. TORBENSEN, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

AXLE AND WHEEL CONSTRUCTION FOR POWER-DRIVEN VEHICLES.

1,417,426.  Specification of Letters Patent.  Patented May 23, 1922.

Application filed July 18, 1919. Serial No. 311,838.

*To all whom it may concern:*

Be it known that I, VIGGO V. TORBENSEN, a citizen of the United States, and a resident of Cleveland, in the county of Cuyahoga and State of Ohio, have invented certain new and useful Improvements in Axle and Wheel Constructions for Power-Driven Vehicles, of which the following is a specification.

My invention relates to improvements in axle and wheel constructions for power-driven vehicles, and the invention is especially useful when embodied in the form of a tractor or a truck axle.

In such axles, and especially agricultural tractor axles, it is desirable to have the apparatus as light as possible consistent with durability, and to have considerable tractive effort or torque at the tread wheel. In view of these requirements it is desirable to have a relatively light engine running at substantially high speed and with considerable gear reduction between the engine and the tread wheel, and the greater portion of the gear reduction should preferably be at the tread wheel so as to permit the use of light differential transmission gearing and other parts.

My invention is directed to the accomplishment of these desirable requirements, and the objects of the invention are to provide a simple and durable axle of the character described, to provide features and combinations of parts which will maintain the gears in proper alignment and adjustment and minimize the undesirable strains thereon, and which will considerably reduce the amount of machine work required in manufacturing such axles and thus reduce the cost, and to provide features by which the wheel structure and other parts may be readily assembled and disassembled not only at the factory, but elsewhere, so that the parts may readily be gotten at for purposes of inspection, repair and replacement.

My invention consists in the novel features and combination of parts hereinafter described in their present preferred embodiment, and the invention will be more particularly pointed out in the appended claims.

Further objects and advantages of the invention will more fully appear from the following description taken in connection with the accompanying drawings illustrating by way of example the present preferred embodiment of the invention as adapted for agricultural tractor axles.

Referring to the drawings, Fig. 1 shows a plan view partly in section, of one embodiment of my invention;

Fig. 3 is also an enlarged view taken on line 3—3 of Fig. 1 looking in the direction of the arrows;

Fig. 4 is a further enlarged view taken on line 4—4 of Fig. 5 looking in the direction of the arrows; and Fig. 5 is a sectional elevation taken on line 5—5 of Fig. 4.

Figure 1:
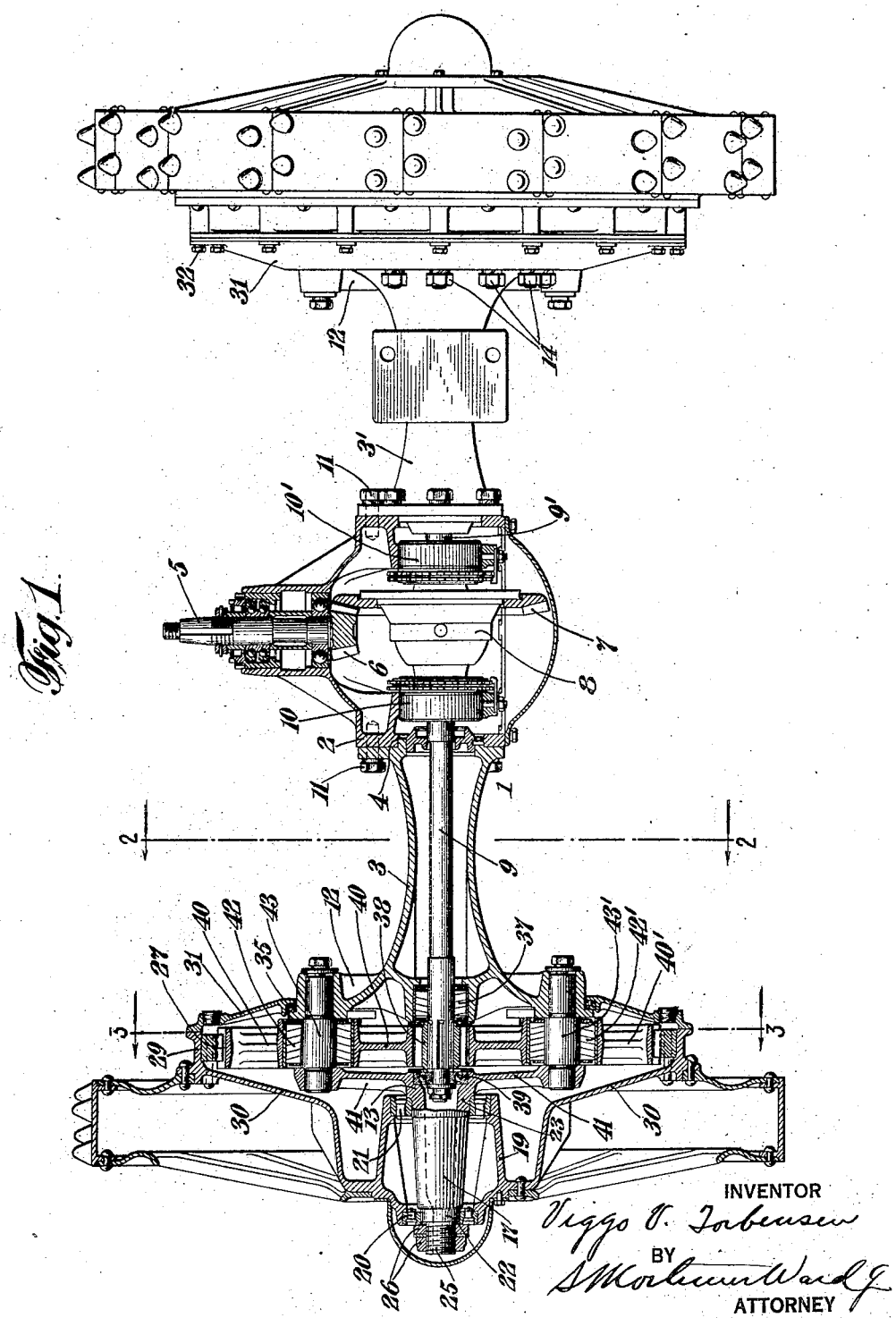
Figure 2:
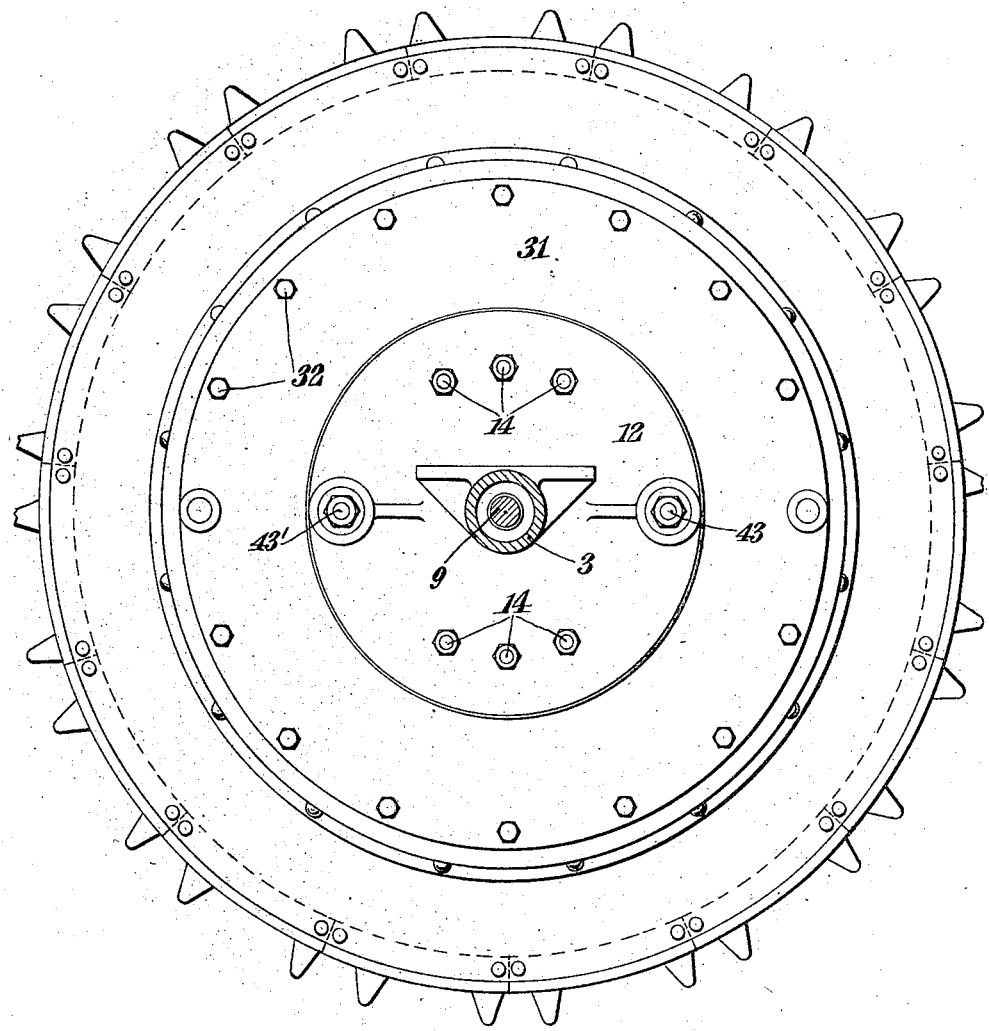
Fig. 2 shows an enlarged end view taken on line 2—2 of Fig. 1 looking in the direction of the arrows.

Referring to the drawings (more particularly to Fig. 1) 1 is a dead-axle comprising three parts, namely, a central differential gear casing 2 and two sleeves or casings 3, 3' bolted at their inner ends to the differential casing so as to form therewith when assembled, a rigid dead-axle for carrying the load. These sleeves are fitted to the differential casing by shouldered engagement as shown at 4. The differential casing is provided with the usual driving shaft 5 carrying a pinion 6 for driving bevel gear 7 secured to the differential housing 8 carrying differential mechanism of any well known form connecting the driven shafts or jack shafts 9, 9'. The inner ends of these shafts are supported in well known adjustable bearing members 10, 10' which, therefore, need not here be described, it being sufficient to say that if it is desired to take down the differential case 2, it is only necessary to release the bolts 11 and displace the sleeves 3 and the jack shaft 9 laterally, whereupon the casing 2 and its contents may be removed.

Inasmuch as the apparatus at each side of the differential casing 2 is identical, only that on one side will be described. The outer end of the dead-axle sleeve 3 is provided with a wheel-supporting lateral extension or bracket of any suitable form, and in the present embodiment the end of the sleeve is provided with an integral annular plate or lateral flange 12 to which is rigidly secured a spider 13 (see more particularly Figs. 4 and 5). This spider is preferably detachably secured to the dead-axle as by means of bolts 14, and the engaging portions of the spider and dead-axle are so formed as to constitute a shouldered engagement so as to form a more staunch and rigid connection relieving the bolts of shearing strains. In the present form of the invention this shouldered engagement is provided for by machining a shoulder 15 on the outer face of the enlarged portion 12 of the dead-axle and concentric with the axis thereof, and by turning a complemental groove 16 in the base of the spider so that the two may be accurately aligned and held rigidly from lateral displacement when the parts are interfitted one with the other. By this means the alignment of the spider with the dead-axle is readily attained, and in a simple and durable manner.

The spider, as shown, has its base portion of general bowl or arcuate form, this portion extending inwardly and outwardly toward the center, from whence the spider projects outwardly in the form of a conical wheel-supporting projection 17. The spider may thus be brought directly into engagement with the dead-axle and rigidly secured thereto so that the strains will be transferred directly from the spider to the dead-axle through the shouldered engagement. The spider, in the present embodiment of the invention, serves to support the tread wheel and also the outer ends of the gear shafts hereinafter to be referred to. As shown more particularly in Fig. 4, in the present embodiment the spider has two base or leg portions 18, but it will be understood that this is because of the fact that two idler gears, hereinafter referred to, are used, and that if but one idler is to be used, the base portion of the spider may be continued on one side between the present legs shown or through as much of the arc as may be desired; and that if for example three idlers are to be used, then three legs may be provided fitting in between the idlers.

Any suitable form of wheel may be used in connection with the axle, the present form being shown by way of illustration. As shown, the wheel is provided with a hub 19 having the usual outer bearings 20 and inner bearings 21, which are accommodated respectively on the bearing supporting portions 22 and 23 of the spider. For this purpose, the outwardly projecting portion of the spider is made substantially coextensive with the tread of the wheel so as to accommodate both the outer and inner bearings of the wheel when arranged as shown, namely, with the inner bearing lying within the planes of the inner and outer edges of the tread of the wheel.

The outer extremity of the spider is threaded as shown at 25, and is provided with a plurality of nuts 26 for holding the wheel in position on the spider. The wheel is provided with a ring gear 27 rigidly secured thereto in any suitable manner, such as by rivets 28, and the wheel is driven by this ring gear through gearing to be described. Flange 29 to which the ring gear is riveted is connected with the hub of the wheel through an impervious diaphragm or web 30, and to the inner end of the flange 29 is tightly secured a deep annular flange 31 as by bolts 32, and this flange 31 has a groove 33 formed in its inner edge which, together with a corresponding groove 34 formed in the outer edge of the end 12 of the dead-axle, provides a retaining groove for a lubricating packing 35 to prevent leakage of lubricant between the flange and dead-axle at this point, while permitting a running joint between the two. By terminating the outer extension or enlargement 15 of the dead-axle reasonably close to the base of the spider, and providing a deep flange 31 on the wheel structure, I am enabled to obtain a deep lubricant chamber which will retain several gallons of lubricant within the wheel structure for lubricating the gearing, with the level of the lubricant below the running joint; and this is a feature of considerable importance, particularly in agricultural tractor apparatus where oiling of the parts is not carefully followed up.

The driving shaft 9 is provided with a bearing 37 formed in the outer extremity of the dead-axle, and is provided beyond that bearing with a driving pinion 38, and beyond the pinion the driving shaft is provided with an outboard bearing 39 carried by the spider. The outboard bearing, carried as it is in a rigid extension of the dead-axle, greatly relieves the driving shaft of strains that it would otherwise be subjected to.

The pinion 38 is geared to the ring gear 27 through one or more suitable idlers 40, 40' (see more particularly Figs. 4, 3 and 1). In the present embodiment two idlers are shown, and they are supported at their outer ends by fulcrum arms or brackets 41, 41. The idlers herein shown are provided with roller bearings 42, 42', and are mounted on stub shafts 43, 43' the outer ends of which are supported by the fulcrum arms 41, 41 and the inner ends of which are supported by the enlarged part 12 of the dead-axle; but it will, of course, be understood that if desired, the hubs of the gears themselves may be extended to these supporting parts and journaled therein. The provision of an outboard bearing for the idlers supported directly and rigidly from the dead-axle is likewise a feature of considerable importance in preventing the undesirable strains that would be placed on the idler shafts if they were journaled only at one end.

It will also appear from the description of this arrangement and construction of parts that if it is desired to build axles of different sizes or having different gear reductions, it is only necessary to change the distance of the stub shaft supports on the spider and dead-axle out from the axis of the axle, and to put on idlers and pinions of different diameters. All the other parts of the axle within the limits of their strength may remain the same for different size axles and for different gear reductions.

Having thus described my invention in connection with the preferred embodiment thereof as specially adapted to agricultural tractor apparatus, it will be obvious to those skilled in the art, after understanding the same, that various changes and modifications may be made in the arrangement and construction of the parts without departing from the spirit and scope of my invention, and I aim in the appended claims to cover all such modifications as are within the spirit and scope of my invention.

Having thus described my invention, what I claim as new and desire to secure by Letters Patent, is:—

1. In apparatus of the character described, the combination of a dead-axle, a driven shaft, a wheel structure, gearing for driving said wheel structure from the driven shaft, a spider rigidly and detachably secured to the dead-axle and having a central portion projecting beyond said gearing, and outer and inner bearings for the wheel structure carried on said spider outwardly of said gearing.

2. In apparatus of the character described, the combination of a dead-axle, a driven shaft, a wheel structure, gearing for driving said wheel structure from the driven shaft, said gearing comprising one or more idlers having stub shafts the inner ends of which are supported by the dead-axle, and a spider having shouldered engagement with the dead-axle and rigidly and detachably secured thereto and supporting the outer ends of said stub shafts for the idlers, and a projection on said spider supporting the outer and inner bearings of said wheel structure.

3. In apparatus of the character described, the combination of a dead-axle, a driven shaft, a wheel structure, a wheel-supporting spider, means rigidly and detachably securing said spider to the dead-axle, gearing connecting the driven shaft to the wheel structure comprising a driving pinion on the driven shaft, a ring gear on the wheel structure and a connecting idler gear, the stub shaft of said last gear having its rear end supported by the dead-axle and its front end by the spider, said spider having a central outward projection for receiving and supporting the wheel structure thereon, said projection being substantially co-extensive with the tread of the wheel and providing a bearing support for the outer and inner bearings of said wheel.

4. In apparatus of the character described, the combination of a dead-axle, a driven shaft, a wheel structure, gearing connecting the wheel structure with the driven shaft, and a wheel-supporting spider rigidly and detachably secured to the dead-axle independently of said gears to form a rigid extension of the dead-axle for supporting the outer and inner bearings of the wheel structure.

5. In apparatus of the character described, the combination of a dead-axle, a driven shaft, a wheel structure, gearing connecting the wheel structure with the driven shaft, comprising one or more gears having stub shafts supported at their inner ends by the dead-axle, a wheel-supporting spider rigidly and detachably secured to the dead-axle independently of said gears to form a rigid extension of the dead-axle for supporting the outer and inner bearings of the wheel structure, said spider also serving to support the outer ends of said gear stub shafts.

6. In apparatus of the character described, the combination of a dead-axle, a wheel-supporting spider the inner end or base of which and the end of said axle are provided with complementary engaging portions to effect shouldered engagement, said complementary portions being concentric with the axle, and said spider having a central outwardly projecting portion providing a bearing support for the outer and inner bearings of a wheel structure, and means for rigidly and detachably securing said spider to said dead-axle.

7. In apparatus of the character described, the combination of a dead-axle, a spider secured to the outer end thereof, a wheel structure mounted on said spider and carrying a ring gear, said wheel structure comprising an outer web connecting the tread and hub of the wheel and an impervious diaphragm extending from the hub of the wheel to the ring gear, a drive shaft having a driving pinion near its outer end, gearing connecting said driving pinion and ring gear, an impervious annular flange secured to the wheel structure and extending a substantial distance from the ring gear inwardly toward the dead-axle and having a running joint with said dead-axle so as to form with said impervious diaphragm a deep, tight oil reservoir for said gearing.

8. In apparatus of the character described, the combination of a dead-axle having a lateral projection at its end, a driven shaft, a wheel structure, having its axis in alignment with the driven shaft, gearing for driving said wheel structure from the driven shaft, a wheel-supporting spider rigidly secured to the lateral projection of the dead-axle and having a central portion projecting beyond said gearing and upon which said wheel structure is adapted to be entirely and removably supported.

In testimony whereof, I have signed my name to this specification.

VIGGO V. TORBENSEN.